(12) United States Patent
Woods

(10) Patent No.: US 8,602,434 B2
(45) Date of Patent: Dec. 10, 2013

(54) DOUBLE CHAINRING DRIVETRAIN

(76) Inventor: Julian E. Woods, San Mateo, CA (US)

( * ) Notice: Subject to any disclaimer, the term of this patent is extended or adjusted under 35 U.S.C. 154(b) by 28 days.

(21) Appl. No.: 13/099,301

(22) Filed: May 2, 2011

(65) Prior Publication Data

US 2012/0280466 A1 Nov. 8, 2012

(51) Int. Cl.
  *B62M 9/02* (2006.01)
(52) U.S. Cl.
  USPC ............ 280/261; 280/259; 280/210; 280/200
(58) Field of Classification Search
  USPC .................................. 280/261, 259, 210, 200
  See application file for complete search history.

(56) References Cited

U.S. PATENT DOCUMENTS

| | | | | |
|---|---|---|---|---|
| 528,145 A | * | 10/1894 | Carr | 474/84 |
| 721,943 A | * | 3/1903 | Dockstader | 74/594.2 |
| 4,309,043 A | * | 1/1982 | Brown | 280/236 |
| 4,398,740 A | * | 8/1983 | Clem | 280/261 |
| 4,816,009 A | * | 3/1989 | Philipp | 474/69 |
| 5,533,741 A | * | 7/1996 | Matsuo | 280/238 |
| 6,053,520 A | * | 4/2000 | Wu | 280/259 |
| 6,085,613 A | * | 7/2000 | Niculescu | 74/594.2 |
| 6,840,136 B1 | * | 1/2005 | Jones | 74/594.2 |
| 2008/0028887 A1 | * | 2/2008 | Valle et al. | 74/594.1 |

* cited by examiner

*Primary Examiner* — Kevin Hurley
*Assistant Examiner* — Michael Stabley
(74) *Attorney, Agent, or Firm* — Ray K. Shahani, Esq.; Kin Hung Lai

(57) ABSTRACT

A double chainring drivetrain system for bicycles that allows riders to apply force directly to a pair of chainrings, one on either side of the bottom bracket. The double chainring drivetrain system has two crank arms, each connected to a peripheral rim portion of the chainrings, and two drive chains. A hub on the rear wheel has two sprockets such that the two drive chains extend between the chainrings and the rear sprockets for transfer of applied rotational forces from the pedals on either side of the bicycle through the two chainrings to the rear sprockets on hub of the rear wheel.

8 Claims, 7 Drawing Sheets

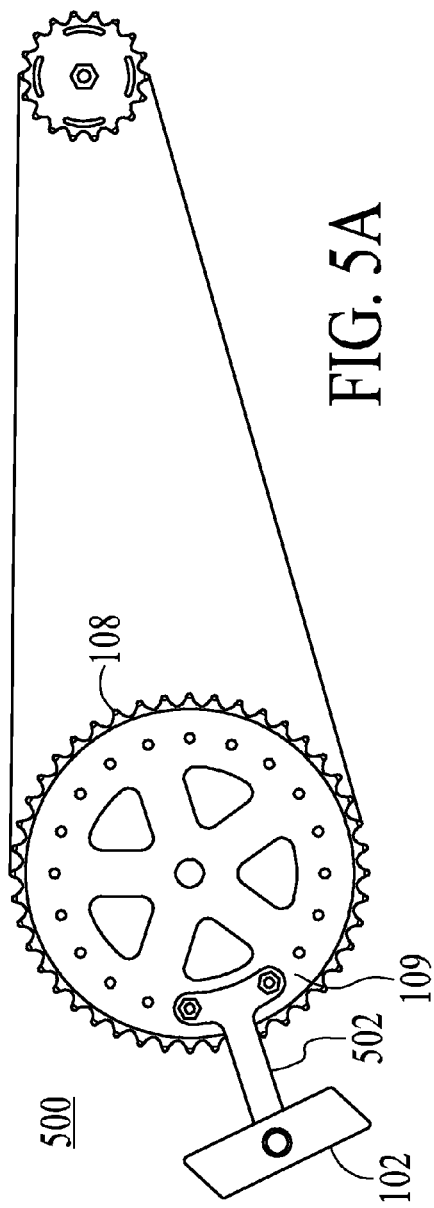
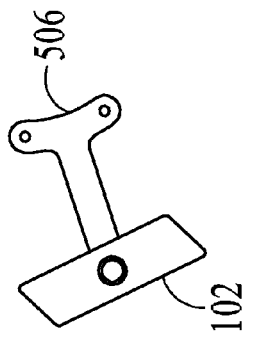
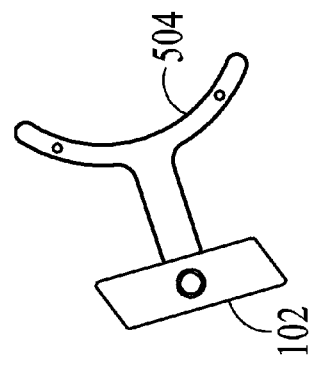
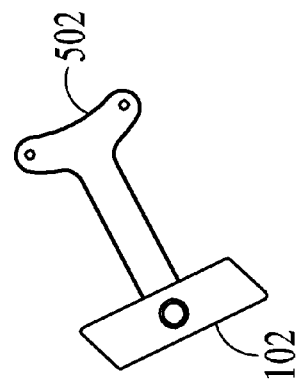
FIG. 5A
FIG. 5B
FIG. 5C
FIG. 5D

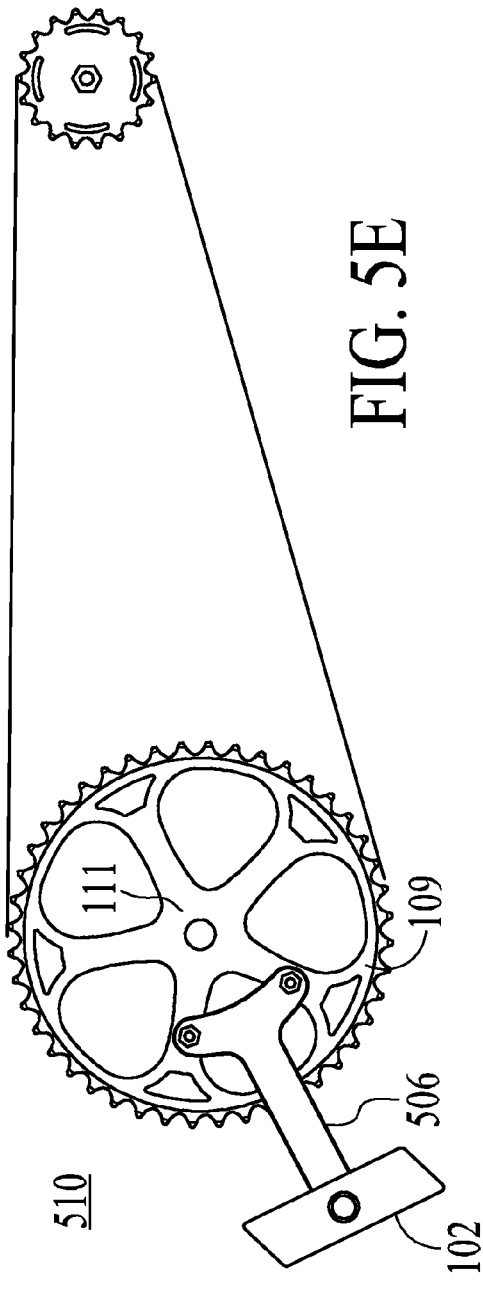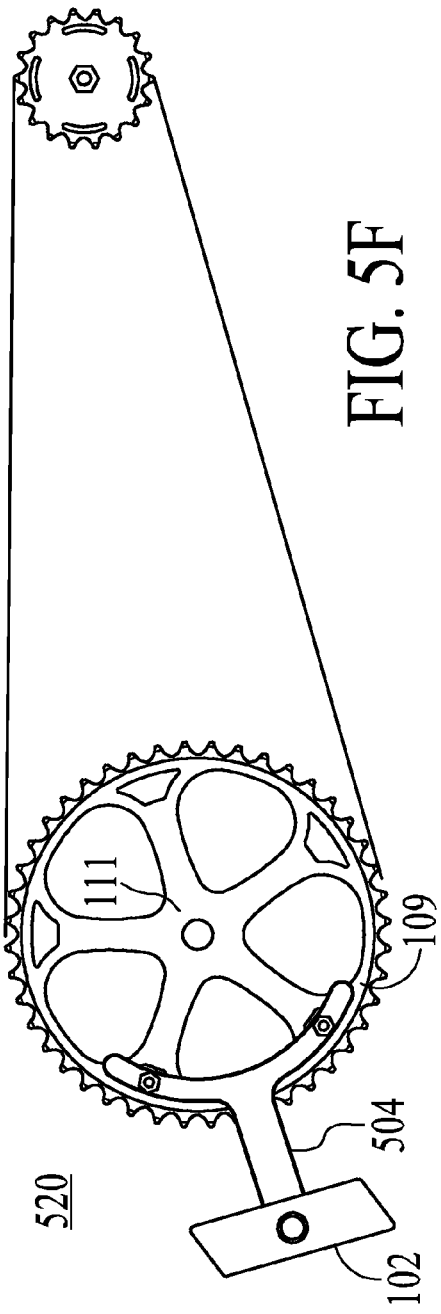

DOUBLE CHAINRING DRIVETRAIN

RELATED APPLICATIONS

None.

FIELD OF THE INVENTION

The present invention relates to an improvement on a conventional pedal-driven, human-powered, single-track bicycle, and more particularly to a double chainring drivetrain system that distributes more power to the rear wheel of the bicycle and requires less human effort to power than possible with the conventional bicycle drive train.

BACKGROUND OF THE INVENTION

Conventional human-powered bicycles are usually driven by a drivetrain system which was developed to transmit power from riders to drive wheels by a variety of methods. Most bicycle drivetrain systems incorporate a freewheel to allow coasting.

The simpler bicycle drivetrain system consists essentially of a single chainring on the right side of the bicycle; a chain; a pair of pedals on either sides and a sprocket on the rear wheel. The system basically converts the reciprocating motion of the rider's legs into rotational motion of the chainring, which subsequently drives the chain which in turn drives the rear wheel. More complicated systems may consist of more than one chainrings attached to the crank set to which the pedals are attached. The chainring is connected to the bicycle frame at the bottom bracket, and to the rear sprocket, cassette or freewheel via the chain. More sophisticated bicycles also include a cogset, a derailleur gears, hub gears, gear case and other parts to enhance efficiency of the bicycle.

Conventional drivetrain systems, while driven by pedals on both sides of the bicycle, primarily only utilize a chainring on one side; usually the right side of the bicycle. Both pedals are connected at the center of the chainring(s) by their respective crank arms coupled to the axle or bottom bracket spindle. There are a variety of methods used to attach the crank arms to the bottom bracket spindle including wedge-shaped pins or cotters, square tapered spindles, hexagonal tapered spindles, and splined bottom bracket spindles.

The present invention is a double chainring drivetrain system which has two identical chainring drivetrains on both sides of a bicycle; working simultaneously and in-sync. It is believed that the present invention can increase the efficiency of bicycles by having two identical chainring drive train.

ADVANTAGES AND SUMMARY OF INVENTION

One object and advantage of the present invention is to provide a more efficient bicycle drivetrain system.

Another object and advantage of the present invention is to provide a more ergonomically comfortable pedal and crank arm system for riders.

Another object and advantage of the present invention is to couple the drivetrain to the chainrings directly instead of through the bottom bracket or axle.

Yet another object and advantage of the present invention is its ability to drive the chainrings on both sides of the bicycle.

Further details, objects and advantages of the present invention will become apparent through the following descriptions, and will be included and incorporated herein.

BRIEF DESCRIPTION OF THE DRAWINGS

FIGS. 5A, 5B, 5C, 5D, 5E and 5F are representative side views of alternative embodiments 500, 510 and 520 of a double chainring drivetrain system of the present invention.

For a better understanding of the invention reference is made to the following detailed description of the preferred embodiments thereof which should be taken in conjunction with the prior described drawings.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

Figure 1A:
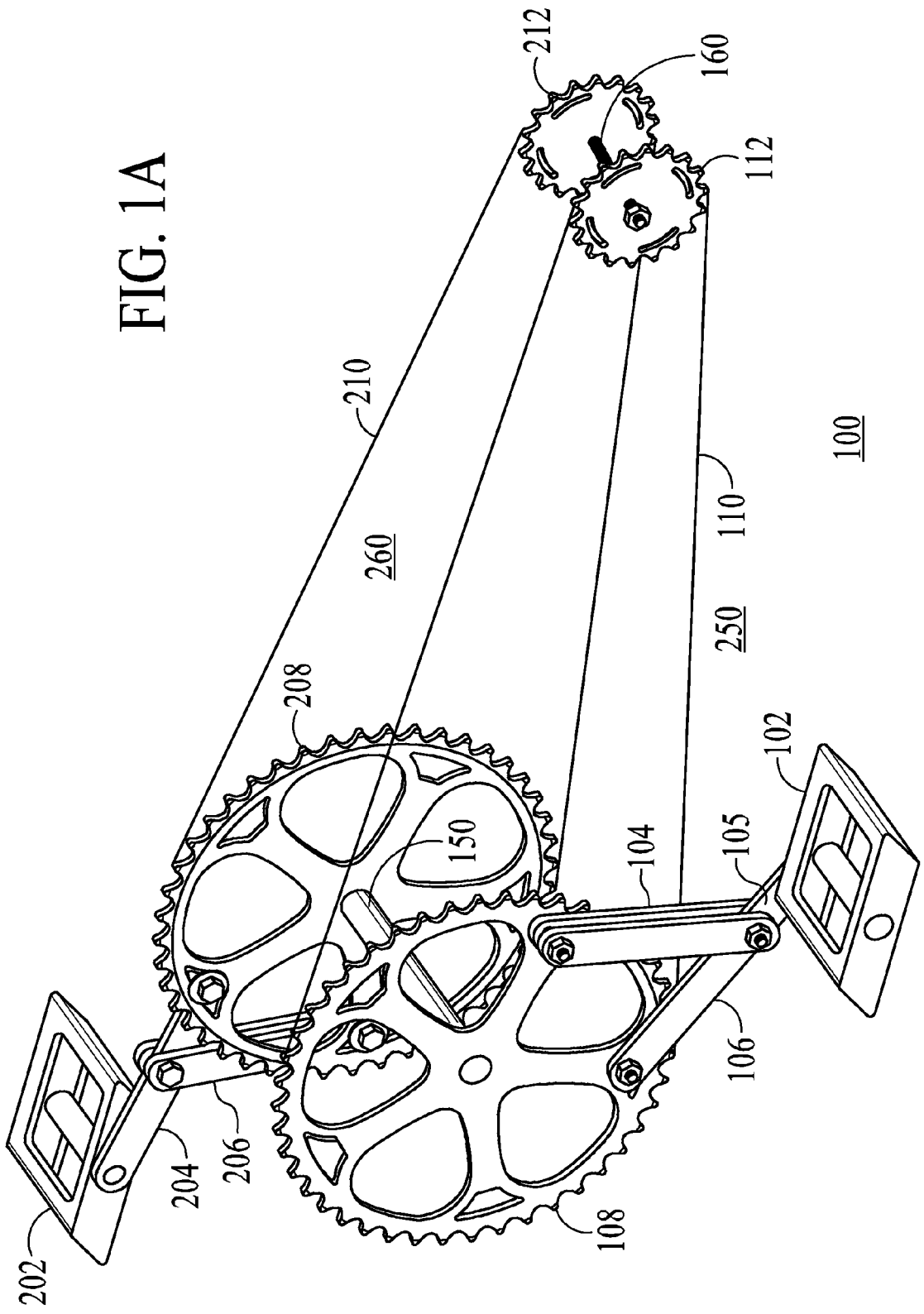
FIG. 1A is a representative isometric view of a double chainring drivetrain system 100 of the present invention.

FIG. 1A is a representative isometric view of a double chainring drivetrain system 100 of the present invention. As best shown in FIG. 1A, the present invention 100 consists essentially a twin sets of identical drivetrain systems 250 and 260. Each drivetrain system 250 and 260 consists essentially of corresponding component parts. As best shown in FIG. 1A, each system consists essentially of chainrings 108 and 208 which can be single chainring, multiple chainring system and other more sophisticated crankset system such as Shimano Deore crankset, Belt-drive crankset etc. The bicycle chain shown representatively as 110 and 210 can be a simple roller chain, block chain, skip-link chain or more sophisticated models and even cable. Pedal crank levers 106 and 206 and chainring crank lever couplings 104 and 204 couple pedals 102 and 202 to chainrings 108 and 208, respectively. Finally, the assembly 100 comprises rear wheel sprockets 112 and 212.

Figure 3:
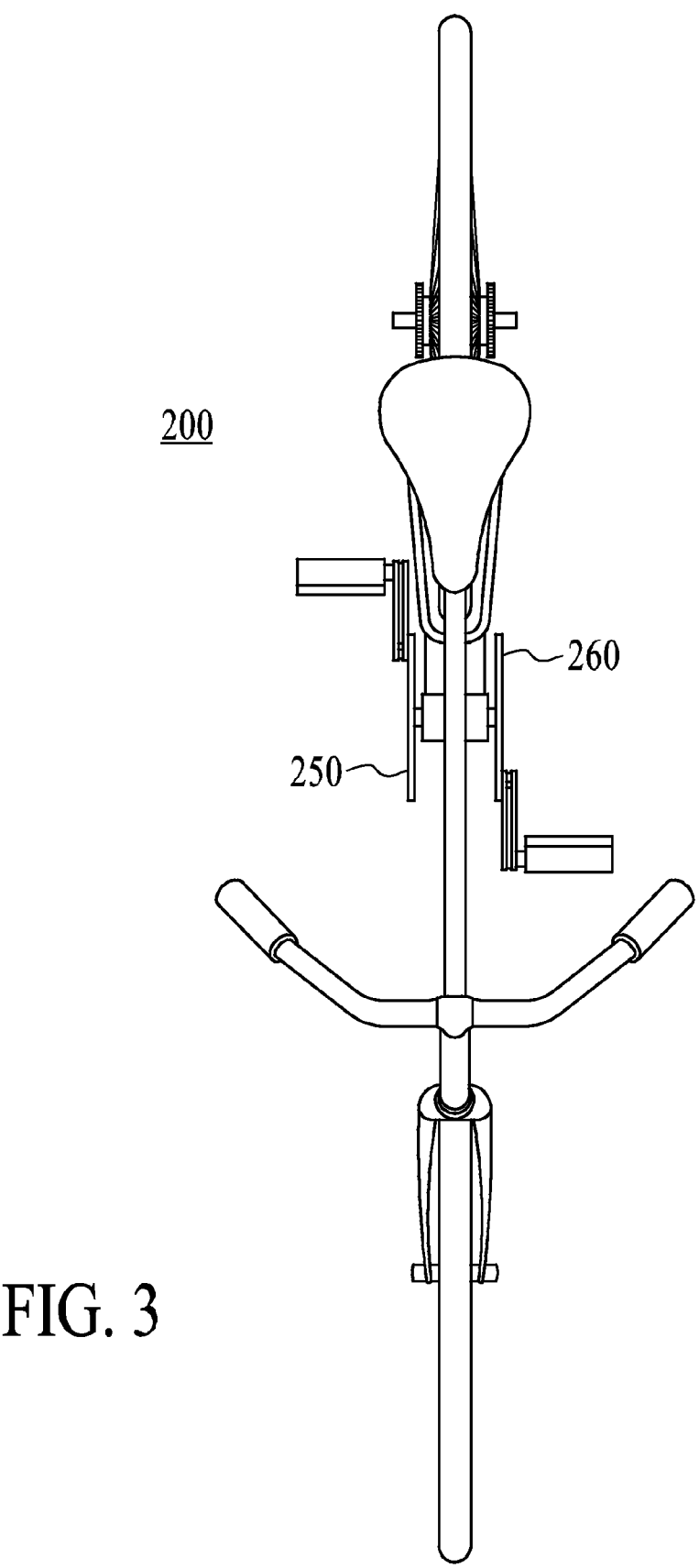
FIG. 3 is a representative top view of a double chainring drivetrain system 100 installed on a bicycle 300.

As best shown in FIG. 3, drivetrain systems 250 and 260 are installed on both sides of a bicycle 200, with right drivetrain system 250 on the right hand side and left drivetrain system 260 on the left hand side of the bicycle 200. In one embodiment, right and left drivetrain systems 250 and 260 are connected at two chainrings 108 and 208, respectively, by double-end front axle 150. At the centers of rear wheel sprockets 112 and 212 there is a double-end hub 160.

In one embodiment, each chainring 108 and 208 is fastened to double-end axle 150. Whereas in a conventional drivetrain system which includes a single crank arm connected at one end to a pedal and at another end to the single chainring, usually on the right side of the bicycle axle, by a bottom bracket that allows the crankset to rotate freely; it further contains a spindle to which the crankset is attached and the bearings that allow the spindle and crank arms to rotate. In one embodiment of the present invention, two chainrings 108 and 208 of the present invention 100 are connected by double-end axle 150. Double-end axle 150 ensures that both chainrings 108 and 208 rotate in unison no matter which chainring receives force of rotation at any point of operation. As for the rear sprockets 112 and 212, the mechanism is similar to conventional bicycles but instead of having one sprocket fastened to one side of the rear hub, rear wheel sprockets 112 and 212 are both fastened to double-end hub 160 on both ends thereof.

In alternative embodiments, rear wheel sprockets 112 and 212 and double-end hub 160 are in the form of thread-on freewheel and hub assembly, freehub and cassette assembly, Shimano cassette and freehub assembly and other more sophisticated embodiments including but not limited to Derailleur gears and other gear changing mechanism. The main function of a double-end hub 160 is to ensure rear wheel sprockets 112 and 212 always rotate simultaneously and in-sync no matter which sprocket is driving rotation at any time during its operation.

Figure 1B:
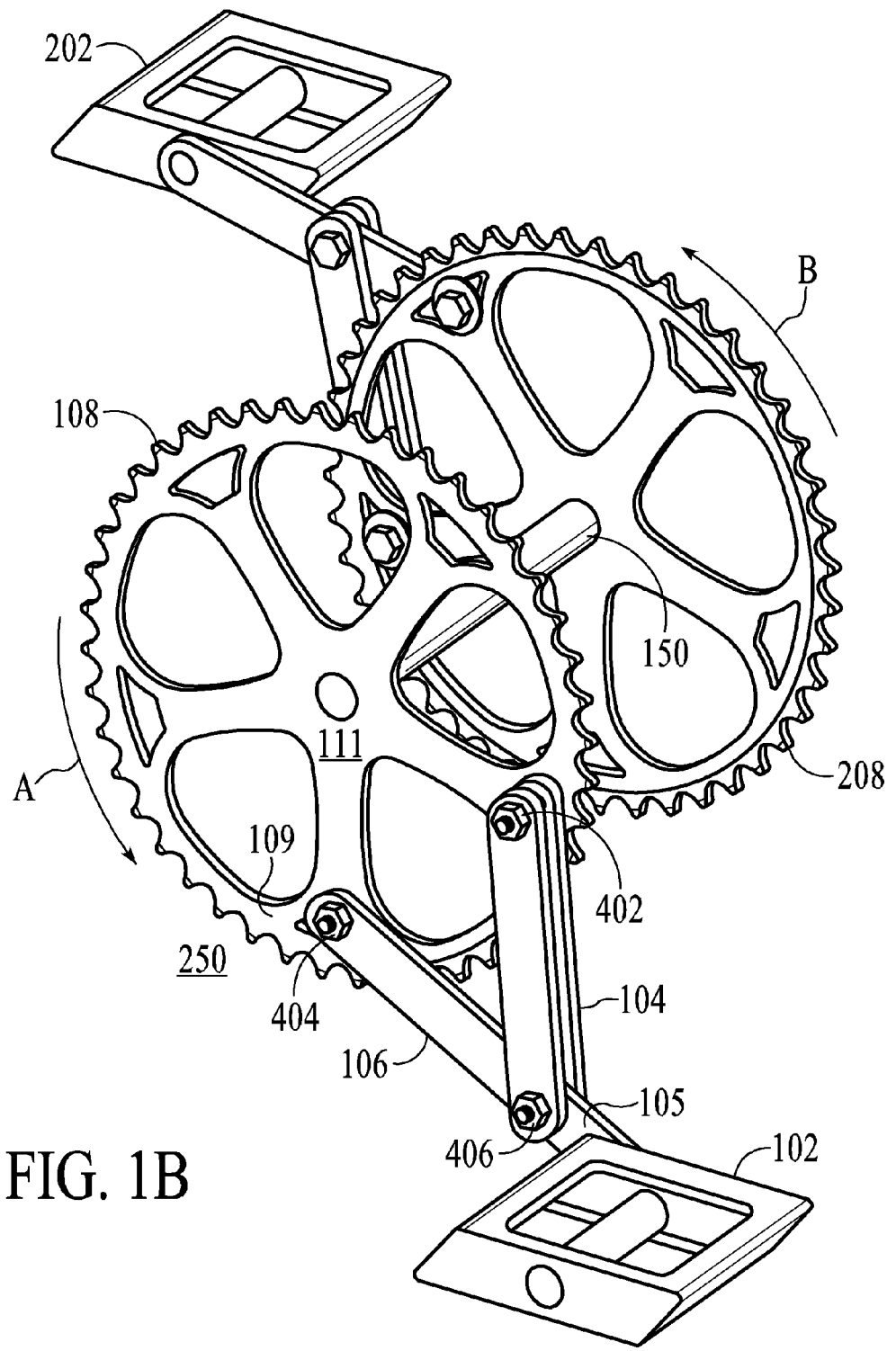
FIG. 1B is a representative isometric view showing pedals 102 and 202 with their respective chainrings 108 and 208.

FIG. 1B is a representative isometric view showing pedals 102 and 202 with their respective chainrings 108 and 208. As shown in FIG. 1B, on the left drivetrain system 250, unlike conventional embodiments, pedal 102 is fastened to chainring 108 near its exterior rim section 109 instead of the center 111 by pedal crank lever 106. Additionally, there is chainring crank lever coupling 104 that is fastened between an adjacent location near the rim 109 of chainring 108 and part way 105 along the length of pedal crank lever 106. The embodiment on the right drivetrain system 260 is operatively the same and the two pedals 102 and 202 are mounted 180° out of phase.

The main advantages of having this particular pedal embodiment of the present invention 100 are that it provides torque and leverage between pedals 102 and 202 and their respective chainrings 108 and 208. Moreover, riders apply force directly to chainrings 108 and 208. The combination enhances overall efficiency of the bicycle 200. As shown in FIG. 1B, when rider [not shown] stands on or pulls up on pedal 102, he/she will drive chainring 108 to rotate in direction A. In one embodiment, chainring 208 will be driven at the same rotational speed in direction B via double-end axle 150. Thus, when riders are pedaling using both pedals 102 and 202, both drivetrain systems 250 and 260 will drive the bicycle 200 together, and the combined rotational force generated will then power the bicycle 200.

Figure 2A:
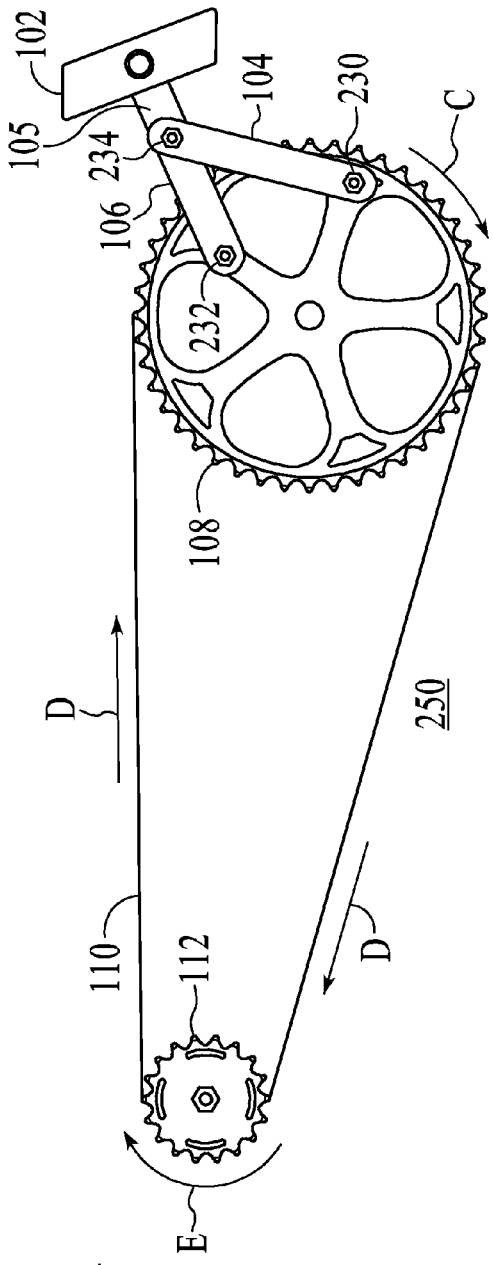
FIGS. 2A and 2B are representative side views of a double chainring drivetrain system 100 of the present invention.
Figure 2B:
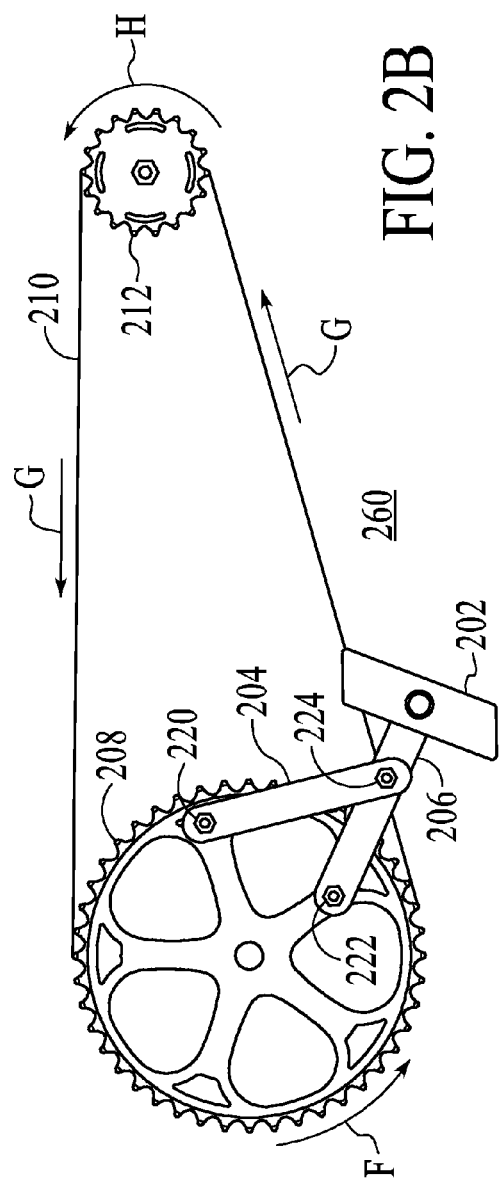

FIGS. 2A and 2B are representative side views of a double chainring drivetrain system 100 of the present invention. As best shown in FIG. 2A, when chainring 108 is driven to rotate in direction C, it will in turn drives chain 110 in direction D and eventually drives rear sprocket 112 in direction E. The mechanism is identical in right drivetrain system 260 as best shown in FIG. 2B. When chainring 208 is driven to rotate in direction F, it will in turn drives chain 210 in direction G and eventually drives rear sprocket 212 in direction H. Since chainrings 108 and 208 are connected, both drivetrain systems 250 and 260 will drive each other at any point of operation and the combined rotational forces generated will then drive rear sprockets 112 and 212.

Figure 4:
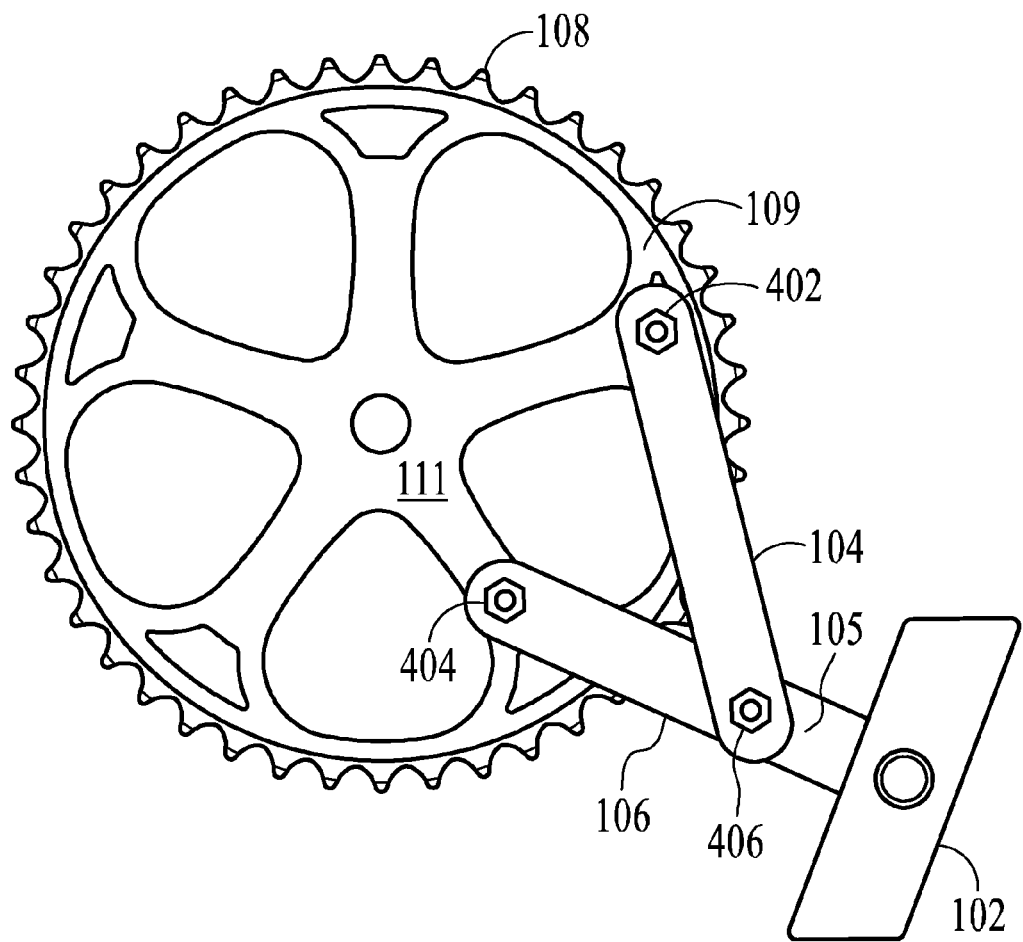
FIG. 4 is a representative side view showing pedal 102 with its corresponding chainring 108.

FIG. 4 is a representative side view showing pedal 102 with its corresponding chainring 108. In one embodiment, pedal 102, and the two crank levers 104 and 106 are all fastened by mechanical coupling systems 402, 404 and 406. In alternative embodiments, mechanical coupling systems 402, 404 and 406 can be a simple threaded nut and bolt mechanism or more sophisticated coupling systems such as rivets, welding, adhesive, or combinations thereof. In alternative embodiments, dimensions of pedal 102, chainring crank lever 104 and pedal crank lever coupling 106 can be adjusted according to riders' needs. Locations of mechanical mean coupling systems 402, 404 and 406 can also be adjusted to suit different riders.

In an embodiment of the present invention, the angle formed between crank arm 106 and bracimg member 104 is equivalent to about 45 degrees, or more or less. In such embodiment, the drive force applied to the pedal 102 is distributed to the chain ring 108 via crank arm 106 and bracing member 104 having a predetermined orientation in which the bracing member 104 lies at an angle of 45 degrees relative to the crank arm 106.

FIGS. 5A, 5B, 5C, 5D, 5E and 5F are representative side views of alternative embodiments 500, 510 and 520 of a double chainring drivetrain system of the present invention. As best shown in FIGS. 5B, 5C and 5D, chainring crank lever 104 and pedal crank lever 106 combination shown in FIG. 4 can be replaced by T-crank arms 502, 504 and 506. In one embodiment, T-crank arms 502, 504 and 506 shaped like a letter "T" and all have a horizontal portion and a vertical portion. As best shown in FIGS. 5A, 5E and 5F, two ends of the horizontal portion of T-crank arms 502, 504 and 506 are fastened to the rim portion 109 of chainring 108. The ends of the vertical portion of T-crank arms 502, 504 and 506 are attached to pedal 102. In alternative embodiments, dimensions of T-crank arms 502, 504 and 506 can be adjusted to suit riders' need. As best shown in FIG. 5E, T-crank arm 506 can be mounted closer to the center of chainring 108 if desired.

It will be understood that, for example in the embodiment shown in FIG. 5AB, the T-shaped crank arm 502 can also be triangular shaped or have secondary bracing support member shown) extending between the proximal 2 mechanical coupling points where the T-shaped crank arm 502 couples to the chain ring and the one mechanical coupling point adjacent the pedal 102. Such secondary bracing members can be formed using flat stock, round stock or stock having any predetermined, cross-sectional shape desired.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A double chainring drivetrain system for bicycles that allows riders to apply force directly to a pair of chainrings on either sides of a bicycle, the double chainring drivetrain system comprising:

identical left side and right side drivetrain sub-systems, the left side and right side drivetrain sub-systems installed on either side of a bicycle, each of the left side and the right side drivetrain sub-systems further having a chainring and a rear sprocket and a continuous drive chain, a pedal, an elongated crank arm having two ends, one end fastened to its corresponding pedal and the other end fastened to its corresponding chainring adjacent a rim portion of the chainring by mechanical means, an elongated lever arm having two ends, one end fastened adjustably to its corresponding crank arm along its length and the other end fastened at an adjacent position along the rim of its corresponding chainring by mechanical means wherein rotational movement generated by the pedal of each drivetrain sub-system to drive its corresponding chainring, subsequently to drive its corresponding rear sprocket assembly via its corresponding continuous chain;

a drivetrain axle having two ends, each end fastened permanently to the chainring of each drivetrain sub-system at its respective center wherein the two chainrings rotate in unison and unidirectionally when the bicycle is ridden; and a rear hub having another axle with two ends, each of the two ends fastened to the rear sprocket assembly of each drivetrain sub-system at its respective center wherein the rear sprocket assemblies rotate in unison and unidirectionally when the bicycle is ridden.

2. The double chainring drivetrain system for bicycles of claim 1 in which the rear sprocket assembly is connected to a rear wheel of the bicycle, wherein the rear sprocket assembly provides rotational drive to the rear wheel.

3. The double chainring drivetrain system for bicycles of claim 1 in which the drivetrain axle has two ends with each end mechanically connected to one of the two chainring assemblies at its center, wherein the chainring assemblies rotate in unison and unidirectionally.

4. The double chainring drivetrain system for bicycles of claim 3 in which the drivetrain axle is disposed within the bottom bracket.

5. The double chainring drivetrain system for bicycles of claim 1 in which the continuous drive chains are roller chains.

6. The double chainring drivetrain system for bicycles of claim 1 in which the continuous drive chains are block chains.

7. A bicycle with double chainring drivetrain, the bicycle comprising:
a front wheel;
a rear wheel having a hub portion with a rear axle extending therethrough, the rear axle having a left end and a right end;
a bottom bracket having a drive axle extending therethrough, the drive axle having a left end and a right end;
a left circular chainring having a center portion and a peripheral rim portion, the left chainring rigidly coupled to the left end of the drive axle at its center portion;
a left crank arm having a proximal end and a distal end, the proximal end of the left crank arm mechanically coupled to the left chainring adjacent its peripheral rim portion;
a left pedal mechanically coupled to the distal end of the left crank arm;
a left rear sprocket mechanically coupled to the left end of the rear axle;
a left drive chain which transfers an applied rotational mechanical force from the left chainring to the left rear sprocket; and
a right circular chainring having a center portion and a peripheral rim portion, the right chainring rigidly coupled to the right end of the drive axle at its center portion;
a right crank arm having a proximal end and a distal end, the proximal end of the right crank arm mechanically coupled to the right chainring adjacent its peripheral rim portion;
a right pedal mechanically coupled to the distal end of the right crank arm;
a right rear sprocket mechanically coupled to the right end of the rear axle;
a right drive chain which transfers an applied rotational mechanical force from the right chainring to the right rear sprocket, wherein as a rider steps on the left pedal the force is transferred from the left chainring through the left drive chain and to the left rear sprocket thereby creating a rotational force on the rear axle and as the rider steps on the right pedal the force is transferred from the right chainring through the right drive chain and to the right rear sprocket thereby adding to the rotational force on the rear axle AND wherein the chainrings and the rear sprockets rotate in unison and unidirectionally.

8. The bicycle of claim 7 further comprising:
a left bracing having a proximal end and a distal end, the proximal end of the left bracing mechanically coupled to the left chainring adjacent its peripheral rim portion, the distal end of the left bracing mechanically coupled to the left crank arm at a position intermediate the proximal end of the left crank arm and the distal end of the left crank arm; and
a right bracing having a proximal end and a distal end, the proximal end of the right bracing mechanically coupled to the right chainring adjacent its peripheral rim portion, the distal end of the right bracing mechanically coupled to the right crank arm at a position intermediate the proximal end of the right crank arm and the distal end of the right crank arm.

* * * * *